US012296576B2

(12) United States Patent
Wu

(10) Patent No.: US 12,296,576 B2
(45) Date of Patent: May 13, 2025

(54) HEAT PRESS MACHINE

(71) Applicant: Procolored Technology Inc, Pico Rivera (CA)

(72) Inventor: Jiangyu Wu, Shenzhen (CN)

(73) Assignee: Procolored Technology Inc, Pico Rivera, CA (US)

( * ) Notice: Subject to any disclaimer, the term of this patent is extended or adjusted under 35 U.S.C. 154(b) by 14 days.

(21) Appl. No.: 18/391,430

(22) Filed: Dec. 20, 2023

(65) Prior Publication Data

US 2024/0123727 A1 Apr. 18, 2024

(30) Foreign Application Priority Data

Sep. 28, 2023 (CN) ......................... 202322656263.5

(51) Int. Cl.
*B41F 16/00* (2006.01)

(52) U.S. Cl.
CPC .................................... *B41F 16/00* (2013.01)

(58) Field of Classification Search
USPC ................................................. D15/146, 122
See application file for complete search history.

(56) References Cited

U.S. PATENT DOCUMENTS

2015/0283776 A1* 10/2015 Robinson ................ B41F 16/02 156/367

FOREIGN PATENT DOCUMENTS

CN 109551872 A 4/2019
CN 112060755 A 12/2020
CN 113561640 A * 10/2021
CN 217455324 U 9/2022
CN 116215062 A * 6/2023

OTHER PUBLICATIONS

English language abstract of CN 113561640 A to Gui et al., publication date Oct. 29, 2021. (Year: 2021).*
English language abstract of CN 116215062 A to Lu et al., publication date Jun. 6, 2023. (Year: 2023).*

* cited by examiner

*Primary Examiner* — Leslie J Evanisko

(57) ABSTRACT

A heat press machine includes a base, a first heating portion, a cover, a second heating portion, a first tray, and a second tray. The base is provided with a working platform. The first heating portion is provided on the base, and is located below the working platform. The cover and the working platform are disposed opposite to each other along a vertical direction. The second heating portion is accommodated in the cover, and is provided opposite to the first heating portion along the vertical direction. A middle of the first tray is provided with a cavity for carrying a substrate, and the first tray is detachably carried on the working platform. The second tray is provided with a carrying plane for carrying a transfer object, and is detachably carried on the working platform. The first tray and the second tray are alternately carried on the working platform.

11 Claims, 4 Drawing Sheets

HEAT PRESS MACHINE

CROSS-REFERENCE TO RELATED APPLICATIONS

This application claims the benefit of priority from Chinese Patent Application No. 202322656263.5, filed on Sep. 28, 2023. The content of the aforementioned application, including any intervening amendments made thereto, is incorporated herein by reference in its entirety.

TECHNICAL FIELD

This application relates to printing devices, and more specifically to a heat press machine.

BACKGROUND

The surface of flat carriers, such as clothing and advertisements, may be printed with personalized characters and patterns through heat transfer printing with a heat press machine. Specifically, the characters or patterns are usually printed onto a release material substrate by, for example, an ultraviolet (UV) printer. Furthermore, a solid hot melt adhesive is formed on the surface of the characters or patterns, and is heated by the heat press machine such that the characters or patterns can be thermally transferred onto the surface of the clothing and advertisements.

Furthermore, the formation of the solid hot melt adhesive of the substrate is usually completed in an oven. For example, the hot melt powder is evenly spread by using a powder spreader on the area of the substrate on which the characters or patterns are printed, and then the substrate is heated in an oven to allow the hot melt powder to become a solid hot melt adhesive.

Therefore, the heat transfer printing of characters and patterns involves many devices, such as a UV printer for printing on the substrate, a powder spreader for spreading powder on the substrate surface, an oven for heating the substrate, and a heat press machine for thermal transfer of characters and patterns, which result in large space consumption, and high cost, thereby restricting the promotion and popularization of the heat transfer process among individual consumers.

SUMMARY

An objective of the present disclosure is to solve, at least to some extent, one of the existing technical problems. To this end, this application provides a heat press machine, which integrates the function of heating the substrate and the function of thermal transfer, reducing the number of machines.

This application provides a heat press machine, comprising:

a base;

a first heating portion;

a cover;

a second heating portion;

a first tray; and a second tray;

wherein the base is provided with a working platform;

the first heating portion is provided on the base and is located below the working platform;

the cover is configured to be driven to be close to or away from the working platform; and when the cover is close to the working platform, and is in an operating state, the cover and the working platform are disposed opposite to each other along a vertical direction;

the second heating portion is accommodated in the cover, and is provided opposite to the first heating portion along the vertical direction when the cover is in the operating state;

a middle of the first tray is provided with a cavity configured for carrying a substrate; the first tray is configured to be detachably provided on the working platform; and when the cover is in the operating state, the cavity is located between the first heating portion and the second heating portion along the vertical direction;

the second tray is provided with a carrying plane configured for carrying a transfer object; the second tray is configured to be detachably provided on the working platform; and, the cover is configured to abut against the carrying plane along the vertical direction when in the operating state; and the first tray and the second tray are configured to be alternately carried on the working platform.

In some embodiments, the working platform is provided with a support, and the support is provided with a plurality of open portions that are open along the vertical direction; and the first heating portion comprises a plurality of heating tubes or a plurality of heating wires; and the plurality of heating tubes or the plurality of heating wires are provided below the support.

In some embodiments, the first tray comprises a support plate and a buffer; the cavity is provided in a middle of the support plate; and the buffer is configured to surround the cavity, and protrude from a surface of the support plate.

In some embodiments, the first tray comprises a support plate and a buffer; and the buffer is annular, and is configured to define the cavity on a surface of the support plate.

In some embodiments, the support plate is provided with a hollow portion in an area where the cavity is located; and the first tray further comprises a support sheet; and the support sheet is located in the cavity, and is configured to cover the hollow portion.

In some embodiments, the second tray comprises a support plate and a buffer; the buffer is provided on the support plate; and the carrying plane is formed on an upper surface of the buffer.

In some embodiments, the second tray further comprises a heat-insulating member; and the heat-insulating member is provided between the support plate and the buffer.

In some embodiments, two sides of the working platform are each provided in a first direction with a baffle, wherein the first direction is orthogonal to a direction in which the first tray and second tray are removed.

In some embodiments, the second heating portion comprises a plurality of heating tubes or a plurality of heating wires; and the plurality of heating tubes or the plurality of heating wires are accommodated in the cover.

In some embodiments, the heat press machine further comprises a linkage mechanism;

wherein the linkage mechanism comprises a base portion; and the base portion of the linkage mechanism is swingably arranged on the base; and the cover is arranged at a distal end of the linkage mechanism and is configured to swing close to or away from the working platform through the linkage mechanism.

The heat press machine has at least the following technical benefits. The heat press machine integrates the function of heating the substrate and the function of thermal transfer, reducing the number of devices involved.

DETAILED DESCRIPTION OF EMBODIMENTS

Figure 1:
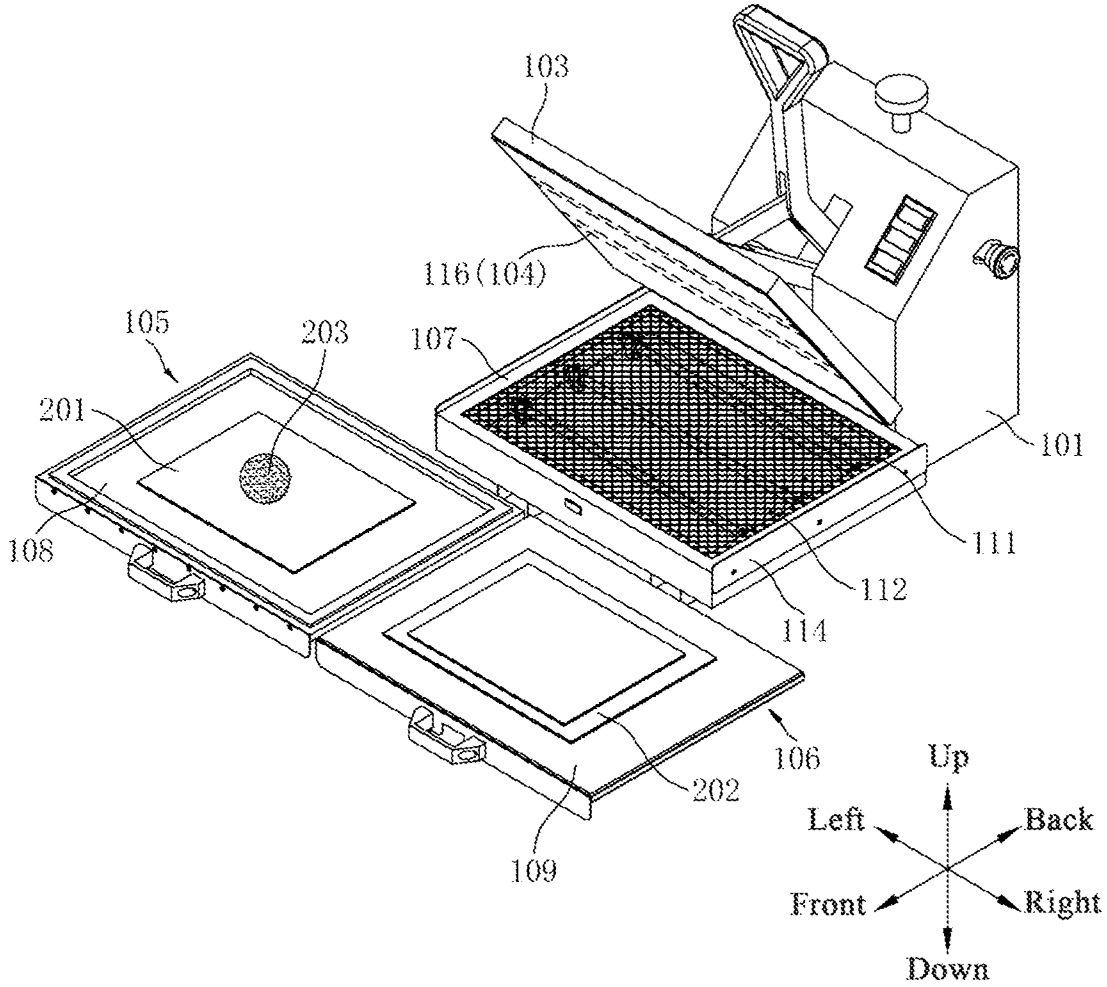
FIG. 1 is a perspective view of a heat press machine according to an embodiment of the present disclosure.

Embodiments of the present disclosure will be described in detail below, and are exemplarily shown in the accompanying drawings, where the same or similar labels throughout indicate the same or similar elements or elements having the same or similar functions. The embodiments described below with reference to the accompanying drawings are exemplary, and are used only for explaining the present disclosure and should not be construed as a limitation of the present disclosure.

It should be understood that as used herein, all directional indicators (such as up, down, front, back, left, right, etc.) are only used to explain the orientation or positional relationships shown in the drawings, and are only for the purpose of facilitating and simplifying the description of the present disclosure, rather than indicating or suggesting that the referred device or element must have a particular orientation, and be constructed and operated in a particular orientation. Therefore, these directional indicators shall not be construed as limitations of the present disclosure.

In the description of the present disclosure, the term “several” means one or more; the term “a plurality of” means two or more; and the terms “greater than”, “less than”, “more than”, etc. are understood to exclude the number per se, and the terms “above”, “below”, “within”, etc. are understood to include the number per se. The terms “first” and “second” are only used for the purpose of distinguishing the technical features, rather than indicating or implying relative importance or implicitly specifying the number of the indicated technical features or a sequential relationship of the indicated technical features.

In the description of the present disclosure, unless otherwise expressly limited, the terms, such as “arrangement”, “installation” and “connection”, shall be broadly construed, and the specific meanings of these terms in the embodiments can be reasonably determined by one of ordinary skill in the art in conjunction with the specific content of the technical solutions.

Referring to FIGS. 1-4, a heat press machine is provided, and prior to the description of the heat press machine, a substrate 201 that is a processing object of the heat press machine and a transfer object 202 are described. In the present embodiment, the substrate 201 is a sheet release material on which characters or patterns are printed. Furthermore, the surface of the characters or patterns on the substrate 201 is spread with hot melt powder 203. The transfer object 202 is a flat carrier, such as clothing and a promotional advertisement suitable for the heat transfer printing.

Figure 2:
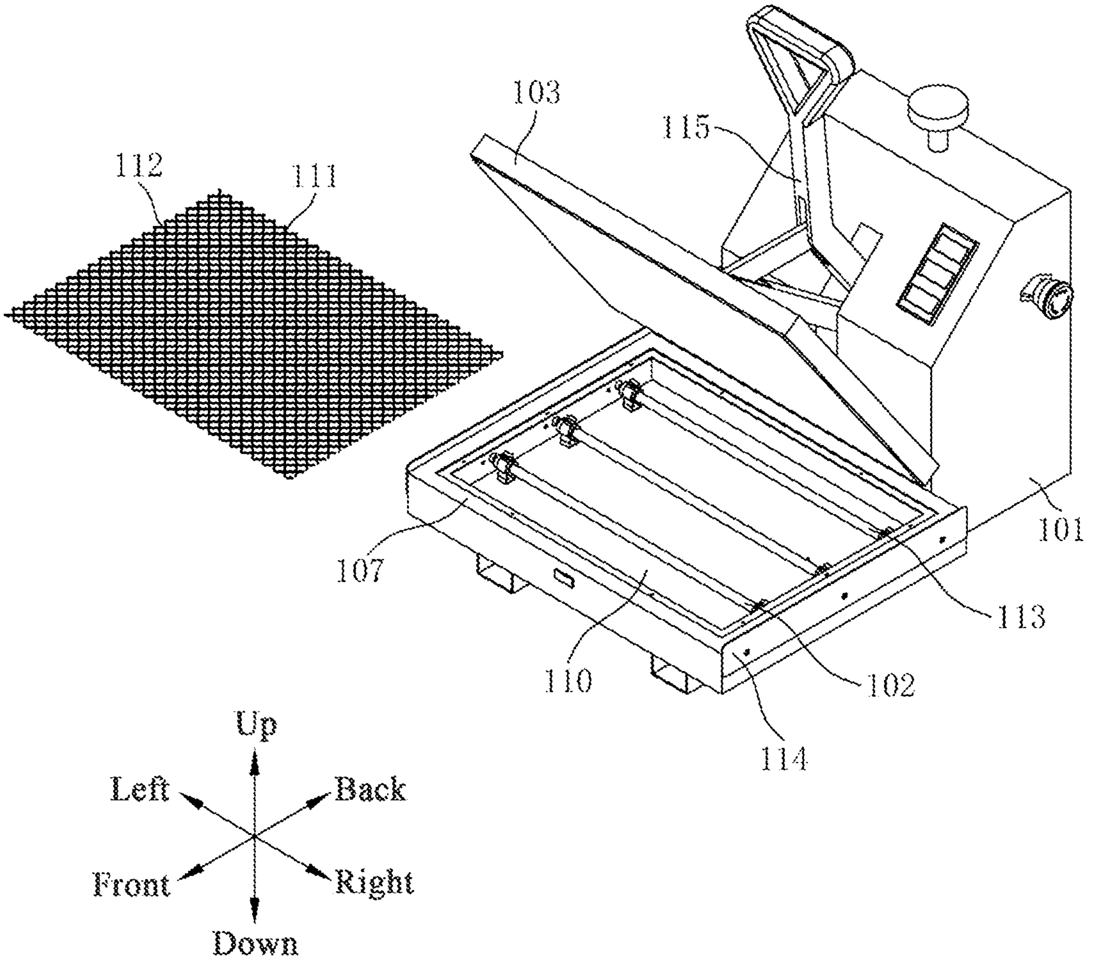
FIG. 2 is a perspective view of a main structure of the heat press machine according to an embodiment of the present disclosure.
Figure 4:
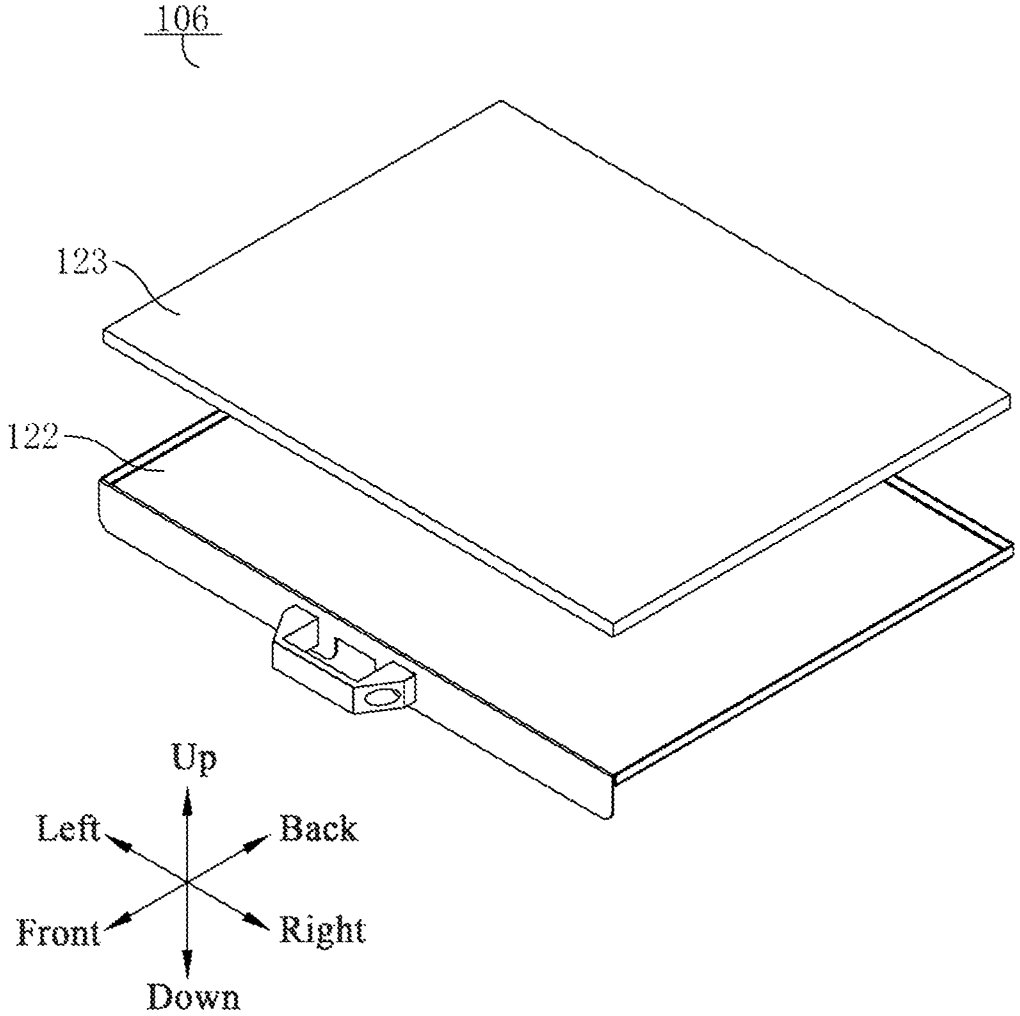
FIG. 4 is an exploded view of a second tray of the heat press machine according to an embodiment of the present disclosure.

Referring to FIGS. 1, 2 and 4, the heat press machine includes a base 101, a first heating portion 102, a cover 103, a second heating portion 104 (dashed portion, built into the cover 103), a first tray 105, and a second tray 106. The base 101 is provided with a working platform 107, and the working platform 107 is configured to carry the first tray 105 or the second tray 106. The first heating portion 102 is provided on the base 101 and is located below the working platform 107. The cover 103 is configured to be driven close to or away from the working platform 107. When the cover 103 is close to the working platform 107 and in an operating state (a state in which the first tray 105 or the second tray 106 can be heated and the cover 103 is substantially parallel to the surface of the working platform 107), the cover 103 and the working platform 107 are disposed opposite to each other along a vertical direction. The second heating portion 104 is accommodated in the cover 103, and is provided opposite to the first heating portion 102 along a vertical direction when the cover 103 is in the operating state. A cavity 108 is formed in the middle of the first tray 105 for carrying the substrate 201. The first tray 105 is detachably provided on the working platform 107. When the cover 103 is in the operating state, the cavity 108 is located between the first heating portion 102 and the second heating portion 104 along a vertical direction. A carrying plane 109 is formed on the second tray 106 for carrying the transfer object 202. The second tray 106 is detachably carried on the working platform 107. When the cover 103 is in the operating state, the cover 103 abuts against the carrying plane 109 along the vertical direction. The first tray 105 and the second tray 106 are alternately carried on the work table 107.

The heat press machine of this embodiment can be operated according to the following steps.

(S1) The substrate 201 is placed in the cavity 108 of the first tray 105 with the hot melt powder 203 facing upwards.

(S2) The first tray 105 loaded with the substrate 201 is placed on the working platform 107 of the base 101.

(S3) The cover 103 is driven to be close to and opposite to the working platform 107 along a vertical direction, and is attached to an upper surface of the first tray 105. In this operating state, the first tray 105 is located between the first heating portion 102 and the second heating portion 104 along the vertical direction. It should be noted that since the substrate 201 is placed in the cavity 108 of the first tray 105 and the bottom surface of the cavity 108 is lower than the upper surface of the first tray 105, the cover 103 will not come into contact with the hot melt powder 203 dispersed on the surface of the substrate 201 in the cavity 108 when the cover 103 is attached to the upper surface of the first tray 105.

(S4) The first heating portion 102 and the second heating portion 104 are activated to simultaneously heat the hot melt powder 203 of the substrate 201 on the first tray 105. In this embodiment, since the heating power required to heat the hot melt powder 203 is greater than the heating power required to perform the thermal transfer printing, the first heating portion 102 is provided below the working platform 107 to sufficiently heat the hot melt powder 203 on the surface of the substrate 201. The substrate 201 on the first tray 105 is heated for, for example, 3-5 min to convert the hot melt powder 203 into a hot melt adhesive state.

(S5) After the heating operation is completed, the cover 103 is opened, and the first tray 105 is removed.

(S6) The transfer object 202 is placed on the carrying plane 109 of the second tray 106. The heated substrate 201 is attached to the transfer object 202 with the hot melt adhesive opposite to the transfer object 202.

(S7) The second tray 106 is placed on the working platform 107 of the base 101.

(S8) The cover 103 is driven to be close to and opposite to the working platform 107 along the vertical direction, and is attached to the carrying plane 109 of the second tray 106. In this operating state, the second tray 106 is located between the first heating portion 102 and the second heating portion 104 along the vertical direction. It should be noted that since the substrate 201 is placed on the carrying plane 109 of the second tray 106, the cover 103 and the second tray 106 firmly hold the transfer object 202 and the substrate 201 when the cover 103 is attached to the carrying plane 109 of the second tray 106.

(S9) The second heating portion 104 is activated to heat the transfer object 202 and the substrate 201 for 30-50 s, so that the characters or patterns on the substrate 201 are transferred to the transfer object 202 through the hot melt adhesive.

(S10) After the heat transfer printing is completed, the cover 103 is opened, and the second tray 106 is removed.

It can be seen from the above steps that the heat press machine of the present embodiment is capable of integrating the function of heating the substrate 201 and the function of thermal transfer printing, reducing the number of devices. Specifically, by providing the first heating portion 102 below the working platform 107 of the heat press machine, in combination with the second heating portion 104 on the cover 103, the heating power of the heat press machine can be increased to heat the hot melt powder 203. In addition, by alternately using the first tray 105 for carrying the substrate 201 for heating the hot melt powder 203 and the second tray 106 for carrying the transfer object 202 for transferring, the thermal transfer printing can be carried out after the heating of the hot melt powder 203 is completed by using the heat press machine. Further, by forming a cavity 108 in the first tray 105, it prevents the cover 103 from contacting with the substrate 201 (and the hot melt powder 203). Thus, the heat press machine of the present embodiment integrates the function of heating the substrate 201 and the function of performing the thermal transfer printing, which reduces the number of devices and the cost, thereby facilitating the promotion of the thermal transfer printing and the heat press machine among individual consumers.

Referring to FIG. 2, in combination with FIG. 1, the base 101 may, for example, be substantially L-shaped. The working platform 107 is formed at a first end of the L-shaped base 101, and the cover 103 is provided at a second end of the L-shaped base 101. The base 101 is provided with a first mounting cavity 110 below the working platform 107, and the first heating portion 102 is accommodated in the first mounting cavity 110. The working platform 107 is provided with a support 111, and the support 111 is provided with a plurality of open portions 112 that are open along a vertical direction. The first heating portion 102 includes a plurality of first heating tubes 113 or first heating wires (not shown in the drawings). The first heating tubes 113 or first heating wires are provided below the support 111, i.e., provided in the first mounting cavity 110. The shape of the open portion 112 is not particularly limited, as long as it facilitates the transfer of heat below the support 111 towards the top of the worktable 107. For example, the support 111 may be in the shape of a grid, with each grid of the support 111 forming an open portion 112 facing towards the first mounting cavity 110. The support 111 is provided on the working platform 107, whereby the support 111 is capable of supporting the first tray 105 or the second tray 106 while allowing the heat from the first heating tube 113 or the first heating wire to be efficiently transferred to the surface of the working platform 107.

Furthermore, to inhibit the offset of the first tray 105 or the second tray 106 on the working platform 107, two sides of the working platform 107 in a first direction is each provided with a baffle 114, where the first direction is a direction orthogonal to the direction in which the first tray 105 and the second tray 106 are dismantled. For example, the first tray 105 and the second tray 106 may be placed onto the working platform 107 substantially along a horizontal direction, and the baffles 114 are accordingly arranged on the left and right sides of the working platform 107, respectively. As a result, by providing the baffles 114, the offset of the first tray 105 or the second tray 106 on the working platform 107 can be suppressed, and the positioning accuracy of the first tray 105 or the second tray 106 can be improved.

A linkage mechanism 115 may be provided at the second end of the L-shaped base 101, and the base portion of the linkage mechanism 115 may be swingingly arranged on the base 101. The cover 103 is arranged on a distal end of the linkage mechanism 115, and moves closer to or farther away from the working platform 107 in a swinging manner by the linkage mechanism 115. The distal end indicates an end of the linkage mechanism 115 away from a hand-holding portion of the linkage mechanism 115. The linkage mechanism 115 is not particularly limited, as long as it can allow the cover 103 to be moved closer to or further away from the working platform 107. For example, the linkage mechanism 115 can be a linkage mechanism 115 used in existing heat press machines.

The cover 103 may be made, for example, of metal (such as a metal sheet) that can conduct heat efficiently. Furthermore, to prevent an operator from accidentally touching the cover 103, a heat insulating material is wrapped around the periphery and on the top of the cover 103, respectively, rendering the side of the cover 103 opposite to the working platform 107 visible. A second mounting cavity (not labeled in the drawings) is formed in the cover 103, and the second heating portion 104 is housed in the second mounting cavity. The second heating portion 104 includes a plurality of second heating tubes 116 or second heating wires, and the second heating tubes 116 or second heating wires are accommodated in the cover 103. In this case, the heat from the second heating tubes 116 or the second heating wires provided in the second mounting cavity can be transferred to the working platform 107 via a side of the cover 103 opposite the working platform 107 when the cover 103 is approached toward the working platform 107 and covers the working platform 107.

Figure 3:
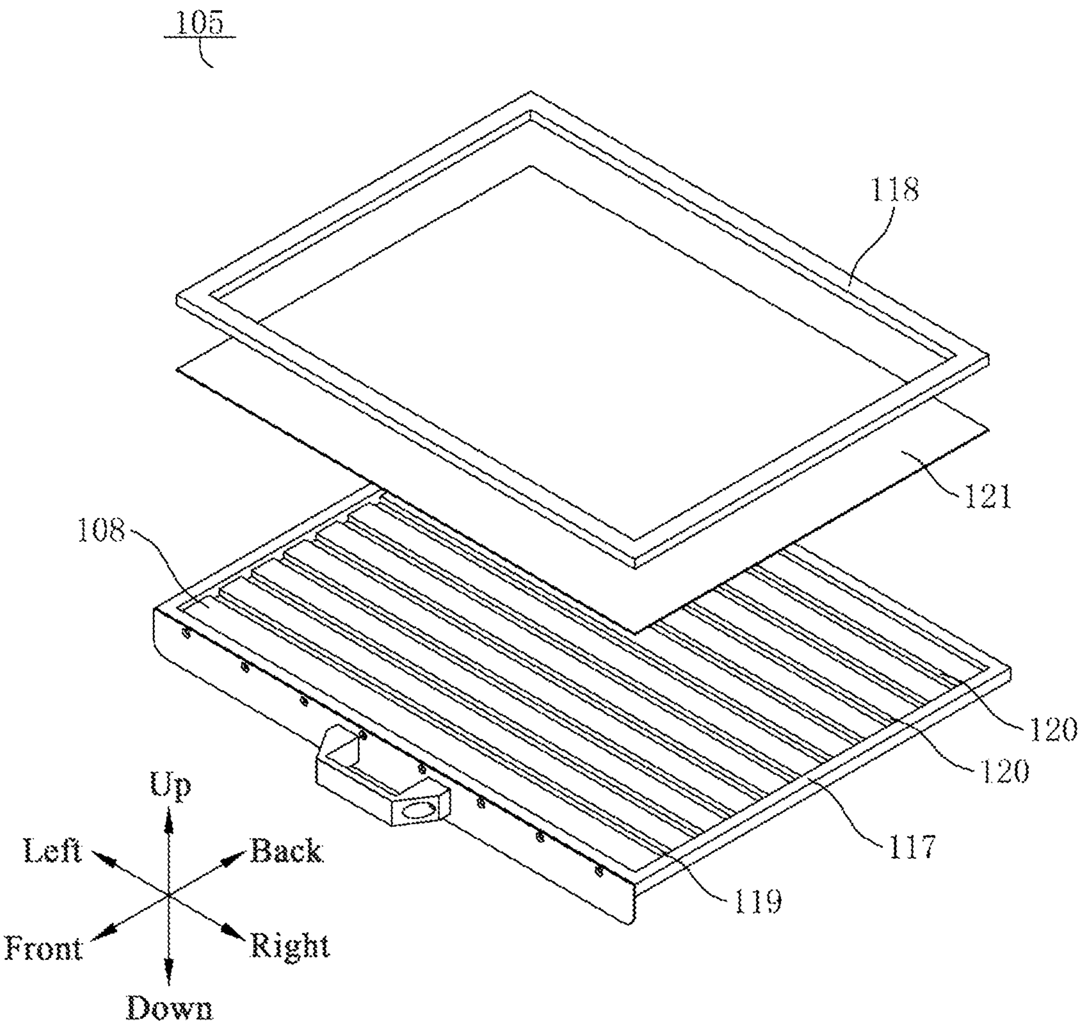
FIG. 3 is an exploded view of a first tray of the heat press machine according to an embodiment of the present disclosure.

Continuing to refer to FIG. 3, as described above, the first tray 105 is configured to carry the substrate 201. In some implementations, the first tray 105 may include a first support plate 117 and a first buffer 118. A middle of the first support plate 117 is provided with a cavity 108, and the first buffer 118 surrounds the cavity 108 and protrudes from a surface of the first support plate 117. The first buffer 118 may be annular and accommodated within the cavity 108. Besides, the first buffer 118 may be provided on an upper surface of the first support plate 105 and surround the cavity 108 from an outer side of the cavity 108. The first buffer 118 may be selected from a cushioning material such as foam, silicone, and rubber. The thickness of the first buffer 118 is not particularly limited, for example, as long as the cover 103 can press against the first buffer 118 and does not contact with the substrate 201 when the cover 103 is in a working state. By pressing the first buffer 118 against the cover 103 in the working state, the cavity 108 can be closed by the cover 103, which can improve the heating efficiency of the first heating portion 102 and the second heating portion 104 can be improved, thereby shortening the time required for melting the hot melt powder 203.

Alternatively, in some embodiments, the first support plate 117 may not be provided with the cavity 108, but the first buffer 118 may be provided directly on the upper surface of the first support plate 117, where the first buffer 118 is annular and defines the cavity 108 on the surface of the first support plate 117. Similarly, in this embodiment, the thickness of the first buffer 118 is not particularly limited, as long as the cover 103 can press against the first buffer 118 and does not contact with the substrate 201 when the cover 103 is in a working state.

In some embodiments, to improve the heat transfer efficiency of the first heating portion 102, the first support plate 117 is provided with a hollow portion 119 in the position where the cavity 108 is located. For example, the first support plate 117 may be substantially flat, where the cavity 108 is formed in the middle of the first support plate 117, and the hollow portion 119 extends through the cavity 108 along the direction of the thickness thereof. For the sake of support of the first support plate 117, the hollow portion 119 may include a plurality of through-slots 120 extending in a left-right direction, and the plurality of through-slots 120 are spaced apart along a back-front direction.

In addition, to prevent the operator from being burned, the first support plate 117 may be selected from an insulating material such as bakelite. In addition, to strengthen the overall support of the first support plate 117, the first tray 105 may also include a support sheet 121, which is located in the cavity 108 and covers the hollow portion 119. The support sheet 121 may be made of a metal material, such as stainless steel, which is easily conductive to heat, and the thickness of the support sheet 121 is not particularly limited, such as 1-3 mm. As a result, by using a heat-insulating first support plate 117 and providing the hollow portion 119 in the cavity 108, it is possible to prevent the first support plate 117 from scalding the operator while ensuring that the heat from the first heating portion 102 can be transmitted to the cavity 108. Moreover, by placing the support sheet 121 that is easily heat-conductive in the cavity 108, it possible to enhance the overall support force of the first tray 105 and improve the transfer efficiency of heat from the first heating portion 102.

Continuing to refer to FIG. 4, in some embodiments, the second tray 106 includes a second support plate 122 and a second buffer 123. The second buffer 123 is provided on the second support plate 122, and the carrying plane 109 is formed on an upper surface of the second buffer 123. The second buffer 123 may be made of a material capable of cushioning, such as foam, silicone, rubber, etc., and is roughly in the shape of a flat plat. In the operating state, the cover 103 may press and fit the second buffer 123, thereby ensuring that the transfer object 202 loaded on the second buffer 123 can fully adhere to the substrate 201, and improving the quality of the transfer printing.

Although the heat (residual heat) from the first heating portion 102 may not necessarily be able to affect the transferring step due to the transferring step consumes less time, to inhibit the rapid transfer of the heat from the first heating portion 102 to the second tray 106 that may affect the transferring step, the second support plate 122 may also be made of a heat-insulating material, such as bakelite. In this case, the heat from the first heating portion 102 can be reduced, and the risk of operator burns can also be reduced.

In addition, in some embodiments, the second tray 106 may also include a heat-insulating member (not shown in the drawings). The heat-insulating member is provided between the second support plate 122 and the second buffer 123. Similarly, the heat-insulating member may be made of bakelite. In this embodiment, the second support plate 122 can also be machined from a sheet metal part.

Although the present disclosure has been described in detail above with reference to the embodiments, one of ordinary skill in the art can still make a variety of changes, modifications, substitutions and variations to these embodiments. It should be understood that those changes, modifications, substitutions and variations made without departing from the principles and purposes of the present disclosure shall fall within the scope of the present disclosure defined by the appended claims.

What is claimed is:

1. A heat press machine, comprising:
a base;
a first heating portion;
a cover;
a second heating portion;
a first tray; and
a second tray;
wherein the base is provided with a working platform;
the first heating portion is provided on the base, and is located below the working platform;
the cover is configured to be driven to be close to or away from the working platform; and when the cover is close to the working platform, and is in an operating state, the cover and the working platform are disposed opposite to each other along a vertical direction;
the second heating portion is accommodated in the cover, and is provided opposite to the first heating portion along the vertical direction when the cover is in the operating state;
a middle of the first tray is provided with a cavity configured for carrying a substrate; the first tray is configured to be detachably provided on the working platform; and when the cover is in the operating state, the cavity is located between the first heating portion and the second heating portion along the vertical direction;
the second tray is provided with a carrying plane configured for carrying a transfer object; the second tray is configured to be detachably provided on the working platform; and the cover is configured to abut against the carrying plane along the vertical direction when in the operating state; and
the first tray and the second tray are configured to be alternately carried on the working platform.

2. The heat press machine of claim 1, wherein the working platform is provided with a support, and the support is provided with a plurality of open portions that are open along the vertical direction; and
the first heating portion comprises a plurality of heating tubes or a plurality of heating wires; and the plurality of heating tubes or the plurality of heating wires are provided below the support.

3. The heat press machine of claim 1, wherein the first tray comprises a support plate and a buffer; the cavity is provided in a middle of the support plate; and the buffer is configured to surround the cavity, and protrude from a surface of the support plate.

4. The heat press machine of claim 3, wherein the support plate is provided with a hollow portion in an area where the cavity is located; and the first tray further comprises a support sheet; and the support sheet is located in the cavity, and is configured to cover the hollow portion.

5. The heat press machine of claim 1, wherein the first tray comprises a support plate and a buffer provided on the support plate; and the buffer is annular, and is configured to define the cavity on a surface of the support plate.

6. The heat press machine of claim 4, wherein the support plate is provided with a hollow portion in an area where the cavity is located; and the first tray further comprises a support sheet; and the support sheet is located in the cavity, and is configured to cover the hollow portion.

7. The heat press machine of claim 1, wherein the second tray comprises a support plate and a buffer; the buffer is provided on the support plate; and the carrying plane is formed on an upper surface of the buffer.

8. The heat press machine of claim 7, wherein the second tray further comprises a heat-insulating member; and the heat-insulating member is provided between the support plate and the buffer.

9. The heat press machine of claim 1, wherein two sides of the working platform in a first direction are each provided with a baffle, wherein the first direction is orthogonal to a direction in which the first tray and second tray are removed.

10. The heat press machine of claim 1, wherein the second heating portion comprises a plurality of heating tubes or a plurality of heating wires; and the plurality of heating tubes or the plurality of heating wires are accommodated in the cover.

11. The heat press machine of claim 1, further comprising:

a linkage mechanism;

wherein the linkage mechanism comprises a base portion; and the base portion of the linkage mechanism is swingably arranged on the base; and the cover is arranged at a distal end of the linkage mechanism, and is configured to swing close to or away from the working platform through the linkage mechanism.

* * * * *